United States Patent
Zimmer et al.

(10) Patent No.: US 7,174,447 B2
(45) Date of Patent: Feb. 6, 2007

(54) PROVIDING A PRE-BOOT DRIVER FOR USE DURING OPERATING SYSTEM RUNTIME OF A COMPUTER SYSTEM

(75) Inventors: Vincent J. Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 399 days.

(21) Appl. No.: 10/713,999

(22) Filed: Nov. 14, 2003

(65) Prior Publication Data

US 2005/0108511 A1    May 19, 2005

(51) Int. Cl.
G06F 9/24    (2006.01)
G06F 9/445    (2006.01)

(52) U.S. Cl. .............................................. 713/1; 713/2
(58) Field of Classification Search .................... 713/1, 713/2, 100
See application file for complete search history.

(56) References Cited

U.S. PATENT DOCUMENTS

| | | | |
|---|---|---|---|
| 5,630,049 A * | 5/1997 | Cardoza et al. ................ | 714/25 |
| 5,913,058 A * | 6/1999 | Bonola ........................... | 713/2 |
| 6,219,828 B1 * | 4/2001 | Lee .............................. | 717/129 |
| 6,324,644 B1 * | 11/2001 | Rakavy et al. .................. | 713/1 |
| 6,996,706 B1 * | 2/2006 | Madden et al. ................ | 713/2 |
| 2004/0215950 A1 * | 10/2004 | Lindeman ...................... | 713/1 |

* cited by examiner

*Primary Examiner*—Thomas Lee
*Assistant Examiner*—Ji H. Bae
(74) *Attorney, Agent, or Firm*—Blakely, Sokoloff, Taylor & Zafman LLP

(57) ABSTRACT

A method and system to provide a pre-boot driver for use during operating system runtime of a computer system. A request to access a hardware device of the computer system is received during OS runtime. The computer system finds the pre-boot driver for the hardware device. The hardware device is accessed during OS runtime using the pre-boot driver.

27 Claims, 5 Drawing Sheets

PROVIDING A PRE-BOOT DRIVER FOR USE DURING OPERATING SYSTEM RUNTIME OF A COMPUTER SYSTEM

BACKGROUND

1. Field of Invention

The field of invention relates generally to computer systems and, more specifically but not exclusively, relates to providing a pre-boot driver for use during the operating system runtime of a computer system.

2. Background Information

In a typical PC architecture, the initialization and configuration of the computer system by the Basic Input/Output System (BIOS) is commonly referred to as the pre-boot phase. The pre-boot phase is generally defined as the firmware that runs between the processor reset and the first instruction of the Operating System (OS) loader. At the start of a pre-boot, it is up to the code in the firmware to initialize the system to the point that an operating system loaded off of media, such as a hard disk, can take over. The start of the OS load begins the period commonly referred to as OS runtime. During OS runtime, the firmware acts as an interface between software and hardware components of a computer system. As computer systems have become more sophisticated, the operational environment between the application and OS levels and the hardware level is generally referred to as the firmware or the firmware environment.

During operating system runtime, applications and the operating system itself often need access to various hardware devices of the computer system. The OS generally uses interfaces, commonly referred to as OS drivers, to access the hardware devices. However, if the OS experiences a problem and cannot use or find the appropriate driver, software or the computer system cannot communicate with hardware devices. A hardware device may only be accessible during pre-boot by the firmware because there is no corresponding OS driver for the device.

Also, accessing hardware devices in a crisis recovery mode, such as an OS safe mode, may be difficult. During safe mode, the OS may attempt to access hardware devices using BIOS interrupt function calls advertised in a BIOS Interrupt Vector Table (IVT). However, not all hardware devices of the system are necessarily advertised in the BIOS IVT. Further, interrupt function calls do not involve interpreted code, so there is no guarantee how the interrupt call may affect the operating system.

Additionally, in an OS safe mode, the operating system may not want to access a hardware device using an OS driver because the behavior of OS drivers is unpredictable. Misbehaving device drivers are often the source of operating system failures. Without the ability to manage the OS driver code execution, the OS is not assured what affect the OS device driver may have on the system until after the code has already run.

BRIEF DESCRIPTION OF THE DRAWINGS

The present invention is illustrated by way of example and not limitation in the accompanying figures.

DETAILED DESCRIPTION

Embodiments of a method and system to provide a pre-boot driver for use during operating system runtime of a computer system are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In one embodiment of the present invention, a pre-boot driver is provided to an operating system of a computer system for use during OS runtime. The pre-boot driver of a hardware device of the computer system is advertised by firmware of the computer system. During OS runtime, the OS finds the advertised pre-boot driver and loads the pre-boot driver into a pre-boot driver interpreter. The OS executes the driver within the pre-boot driver interpreter to access the hardware device.

In one embodiment of the present invention, firmware of a computer system operates in accordance with an extensible firmware framework known as the Extensible Firmware Interface (EFI) (EFI Specification, Version 1.10, Dec. 1, 2002, may be found at http://developer.intel.com/technology/efi.) EFI is a public industry specification that describes an abstract programmatic interface between platform firmware and shrink-wrap operating systems or other custom application environments. The EFI framework standard includes provisions for extending BIOS functionality beyond that provided by the BIOS code stored in a platform's BIOS device (e.g., flash memory.) More particularly, EFI enables firmware, in the form of firmware modules and drivers, to be loaded from a variety of different resources, including primary and secondary flash devices, option ROMs (Read-Only Memory), various persistent storage devices (e.g., hard disks, CD-ROM (Compact Disk-Read Only Memory), etc.), and from one or more computer systems over a computer network.

Figure 1:
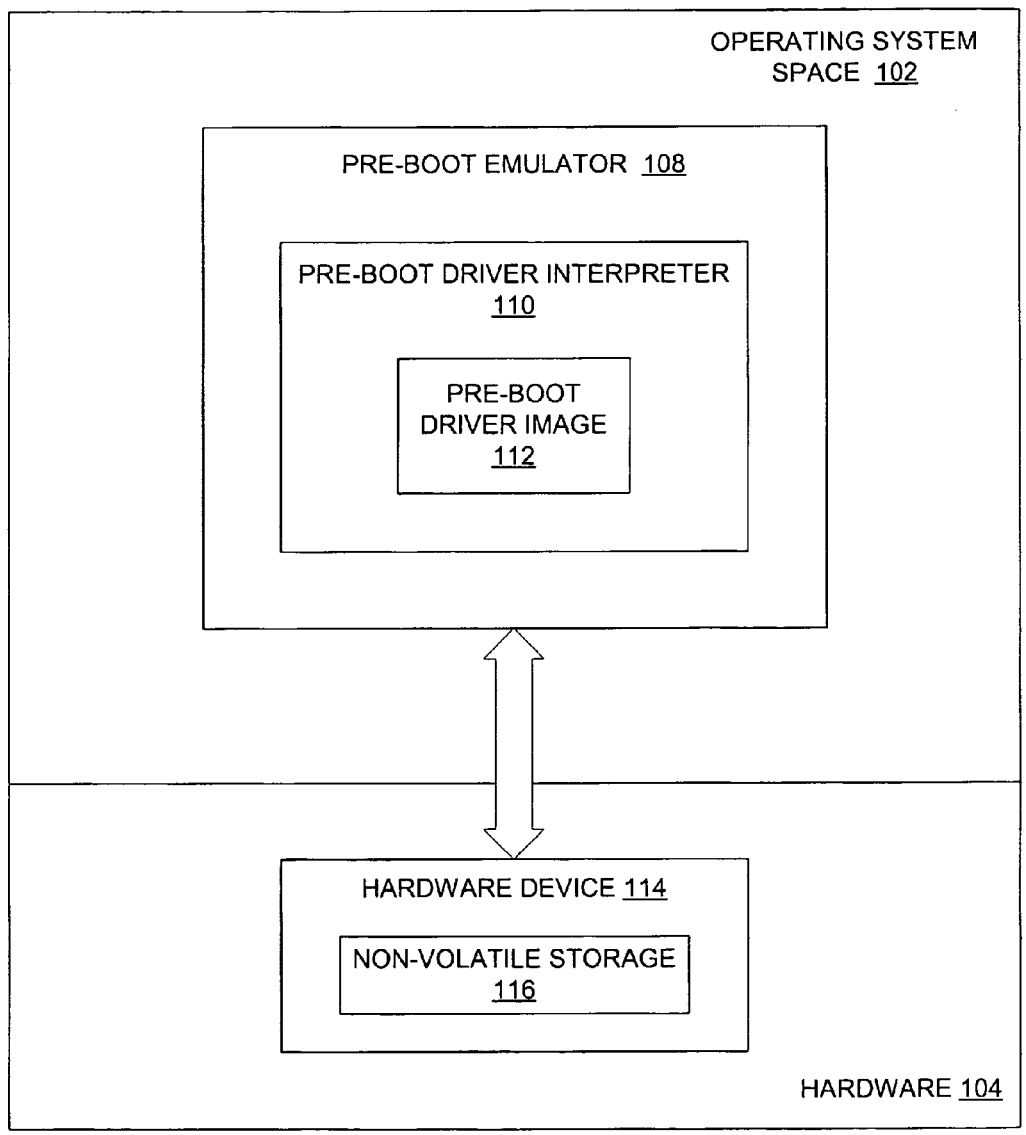
FIG. 1 is a schematic diagram illustrating one embodiment of providing a pre-boot driver for use during operating system runtime of a computer system in accordance with the teachings of the present invention.

FIG. 1 illustrates an embodiment of the present invention to provide a pre-boot driver for use during operating system runtime of a computer system 100. FIG. 1 shows an operating system space 102 layered on hardware 104 of the computer system 100. In one embodiment, the operating system space 102 includes a kernel mode space and a user mode space. The hardware 104 includes a hardware device 114. Hardware device 114 includes, but is not limited to, a processor, a chipset, a memory module, an Input/Output (I/O) block device, or the like. An I/O block device includes a disk controller, a RAID (Redundant Array of Inexpensive Disks) controller, a network controller, a modem, or the like. In one embodiment, the hardware device 114 includes an expansion board (also known as an add-in card). Only one hardware device 114 is shown in FIG. 1 for clarity, but it will be understood that embodiments of the present invention may operate with more than one hardware device on the same computer system.

In one embodiment, the hardware device 114 includes a pre-boot driver stored on the hardware device 114. In one embodiment, the pre-boot driver is stored on a non-volatile storage device 116 of the hardware device 114. The pre-boot driver is a program that contains knowledge of the hardware device to enable interaction with the hardware device by the computer system 100. The pre-boot driver is normally executed during the pre-boot phase.

In one embodiment, the pre-boot driver includes an interpreted pre-boot driver image. The pre-boot driver image is a machine-independent and OS-independent image. Thus, the pre-boot driver may provide one image to serve multiple computer system configurations. Hardware device manufacturers may support different computer architectures without needing to supply a different driver image for each one.

Additionally, the pre-boot driver image includes interpreted code. That is, each op-code of the pre-boot driver image is converted into executable code and executed one op-code at a time. Using interpreted code enables the execution of the pre-boot driver image to be managed one op-code at a time and to handle errors that may be caused by the pre-boot driver image before they are allowed to occur on the computer system 100.

FIG. 1 also shows the operating system space 102 including a pre-boot emulator 108. The pre-boot emulator 108 includes a pre-boot driver interpreter 110 having loaded a pre-boot driver image 112. The pre-boot emulator 108 acts as a host for the pre-boot driver interpreter 110 and establishes a simulated pre-boot environment for the pre-boot driver interpreter 110 to operate within. The pre-boot emulator 108 acts as an interface between the OS space 102 and the pre-boot driver interpreter 110. In one embodiment, the pre-boot interpreter 110 may believe it is actually running in pre-boot and has no knowledge of the operating system.

The pre-boot driver interpreter 110 enables pre-boot driver image 112 to be executed during OS runtime in order to provide access to hardware device 114. In yet another embodiment, the pre-boot driver interpreter 110 includes an EFI Byte Code (EBC) Virtual Machine that can provide platform and processor independent mechanisms for loading and executing EFI device drivers. In another embodiment, the pre-boot driver includes an EFI Byte Code (EBC) image. In one embodiment, the pre-boot driver interpreter 110 is a kernel mode application; while in another embodiment, the pre-boot driver interpreter 110 is a user mode application.

During OS runtime, the operating may receive a request from an application or have its own need to access the hardware device 114. Generally, the OS will use an OS native driver to access the hardware device. However, if the OS native driver has failed or is not available, then the OS may load pre-boot driver image 112 into the pre-boot driver interpreter 110 and execute the driver in order to access the hardware device 114. In one embodiment, the pre-boot driver image 112 is advertised by firmware in a data structure of the computer system.

Executing an interpreted pre-boot driver image in the pre-boot driver interpreter enables the operating system to actively manage the image and stop the driver before it performs an action dangerous to the computer system. In one embodiment, the pre-boot driver operates in accordance with the EFI framework standard. In yet another embodiment, the pre-boot driver includes an image according to the IEEE (Institute of Electrical and Electronics Engineers) Standard 1275-1994 (IEEE Standard for Boot Firmware).

In one embodiment, the present invention may be implemented during the install process of an operating system. During such an installation, the operating system can use the pre-boot driver made available by the firmware to access a hardware device. The OS native driver may not be installed yet or may not be part of the installation package. In another embodiment, the present invention may be used in a crisis recovery scenario. In such a scenario, the operating system may be partially failed or completely failed or portions of a storage device may be corrupted that contain OS native drivers. In this crisis recovery scenario, the OS may use a pre-boot driver to interact with a hardware device if the OS native driver is not available to the OS. Also, using the interpreted pre-boot driver enables the OS to actively manage the driver execution to prevent further harm to the computer system.

Figure 2:
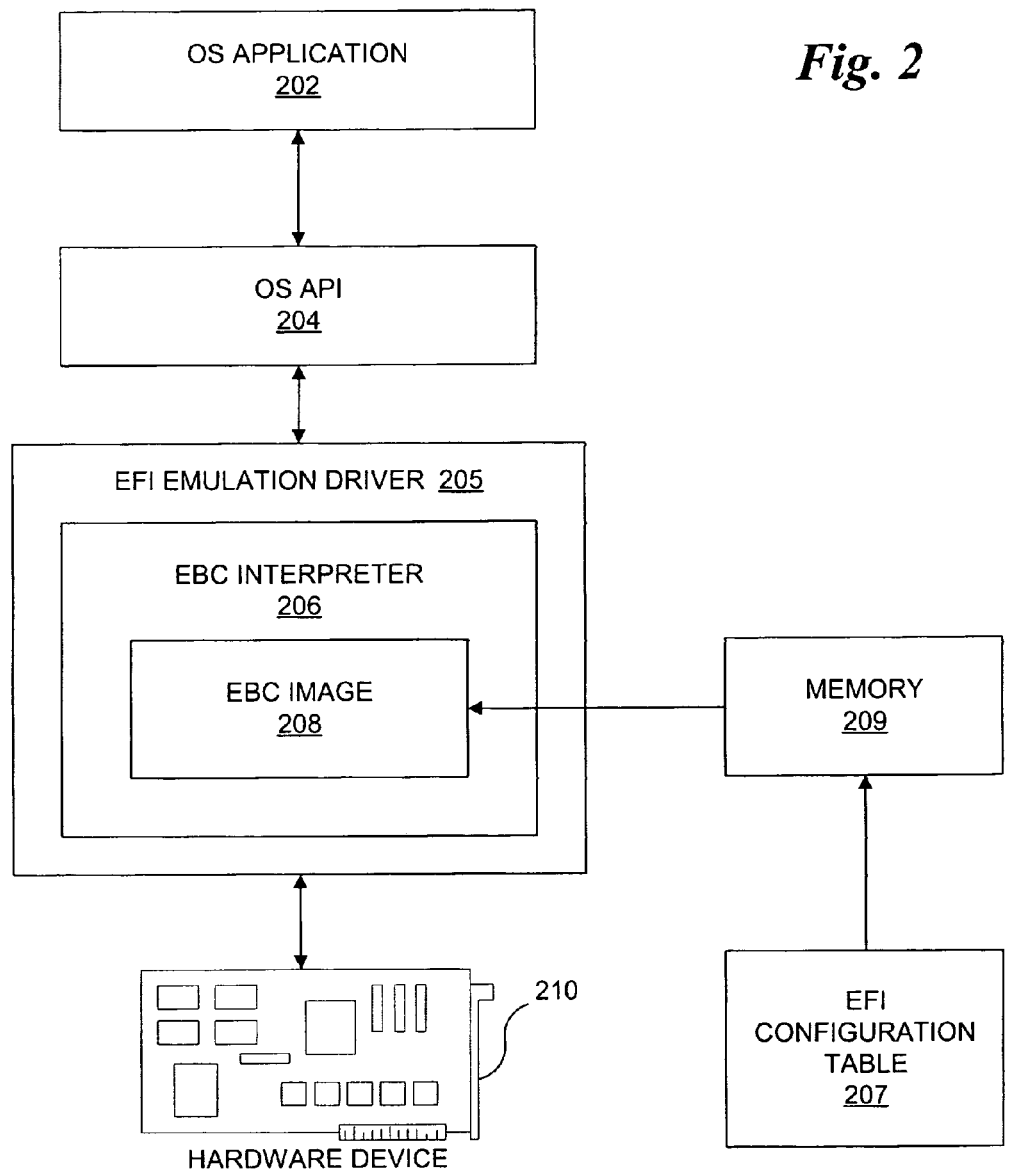
FIG. 2 is a schematic diagram illustrating one embodiment of providing a pre-boot driver for use during operating system runtime of a computer system in accordance with the teachings of the present invention.

FIG. 2 illustrates an embodiment of the present invention to provide a pre-boot driver for use during operating system runtime in an EFI environment. FIG. 2 shows an OS application 202 requesting to access a hardware device 210. The OS application 202 makes a call to an OS Application Program Interface (API) 204. The OS API 204 is published to the computer system and provides a way for applications to request services from the operating system.

Since an OS native driver is not available for the hardware device 210, the OS API request is diverted to an EFI Emulation Driver 205. An EBC Interpreter 206 is launched within the EFI Emulation Driver 205. An EBC Image 208 is loaded into EBC Interpreter 206 from memory 209. The EFI Emulation Driver 205 provides an EFI environment for the EBC Interpreter 206. The EFI Emulation Driver 205 will proxy OS native driver calls between the OS API 204 and the hardware device 210.

EBC Image 208 is a pre-boot driver image. An EBC image can be executed by computer systems that implement EFI. The EBC image may be executed on multiple platforms and architectures including both the Itanium®-based and IA-32 (Intel Architecture 32-bit processor) architectures. Since a single EBC image may be executed on multiple platforms, a reduction in code size is realized. In one embodiment, the hardware device 210 is an expansion card on which an EBC image is stored. This allows expansion card manufacturers to more efficiently serve many markets. Vendors only need to provide a single binary stored on the expansion card versus having to incur additional costs to provide multiple binaries for multiple architectures. Furthermore, the EFI framework standard discussed above is configured to work with drivers written in EBC.

FIG. 2 also shows an EFI Configuration Table 207. EFI configuration table 207 is a data structure used by the firmware to advertise the pre-boot driver. During the pre-boot phase of an EFI-compliant system, an EFI System Table is constructed. The EFI System Table contains an EFI Configuration Table 207. The EFI Configuration Table 207 includes a set of GUID (Globally Unique Identifier)/pointer pairs. In one embodiment, the GUID is used as an identifier for the pre-boot driver and the corresponding pointer indicates the location of the driver image in memory. In one embodiment, the pre-boot driver image is loaded into memory during the pre-boot phase. During OS runtime, the OS may search the EFI Configuration Table 207 to determine if a pre-boot driver is available for a particular hardware device and execute such a pre-boot driver image.

Normally when an OS initializes, the OS can detect devices that are on-board or plugged into a slot. The OS can determine by analyzing the configuration space for each device if the OS has a corresponding OS native driver for that device. If the OS does not find the OS native driver, then the OS can search the Configuration Table 207 for a possibly exported EBC Image.

Continuing in FIG. 2, the OS application 202 uses OS API 204 to request access to hardware device 210. The OS loads the EBC image 208 into the EBC interpreter 206 and executes the EBC image 208. The OS uses the EBC image 208 to provide access to hardware device 210 for the OS application 202. The EBC image 208 executed in the EBC interpreter 206 enables the OS to maintain strict control over the EBC image 208.

Use of pre-boot drivers, such as EBC images, is useful when an operating system is working in a safe mode. Usually, safe mode is a conservative and restrictive mode where the OS uses services that are trustworthy. By using pre-boot drivers, hardware devices can be accessed safely by the operating system even if a hardware device does not have an entry in the BIOS IVT. Also, interpreted pre-boot drivers enable management of the code execution so that a driver can be stopped before it causes a system failure.

Figure 3:
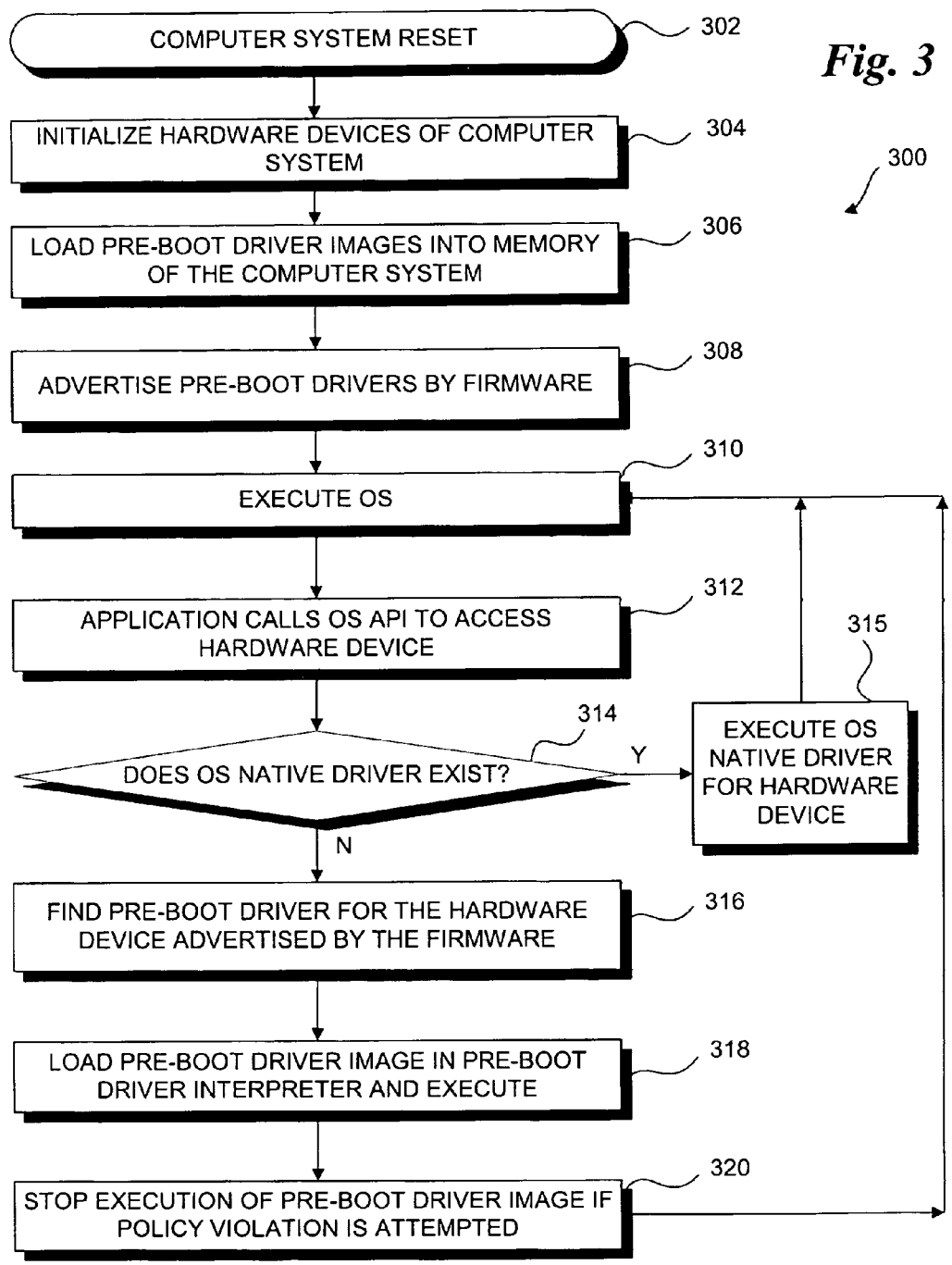
FIG. 3 is a flowchart illustrating one embodiment of the logic and operations to provide a pre-boot driver for use during operating system runtime of a computer system in accordance with the teachings of the present invention.

Referring to FIG. 3, a flowchart 300 illustrates one embodiment of the present invention to provide a pre-boot driver for use during OS runtime in a computer system. In a block 302, the computer system is reset. In response to the reset event, pre-boot initialization of the computer system will begin through loading and execution of system boot instructions stored in the computer system firmware. In one embodiment, the system boot instructions will begin initializing the platform by conducting a Power-On Self-Test (POST) routine.

In a block 304, the hardware devices of the computer system are initialized during the pre-boot phase. During the pre-boot phase, hardware devices such as a processor, the chipset, and memory of the computer system are initialized. The firmware also initializes expansion boards populating the ISA (Industry Standard Architecture), PCI (Peripheral Component Interface), AGP (Accelerated Graphics Port) or other expansion slots of the computer system. The firmware of the computer system examines each hardware device to determine if the hardware devices have stored any pre-boot drivers.

Continuing in a block 306, the pre-boot driver images of pre-boot drivers found in hardware devices are loaded into memory of the computer system. In one embodiment, the pre-boot drivers include EBC images. In a block 308, the pre-boot drivers found are advertised by the firmware. The firmware advertises the pre-boot drivers to make them available to the OS during OS runtime. In one embodiment, the pre-boot drivers are advertised by the firmware in a data structure of the computer system. In another embodiment, such a data structure is compliant with the EFI framework standard.

Proceeding to a block 310, the OS is loaded and executed to begin OS runtime. In a block 312, an application (or the OS itself) calls an OS API to access a hardware device. Proceeding to a decision block 314, the OS determines if an OS native driver exists for the hardware device. If the answer is yes, then the logic proceeds to a block 315 to execute the OS native driver for the hardware device in order to provide the application access to the hardware device. After the access to the hardware device is completed in block 315, the logic returns to block 310 to continue execution of the operating system.

If the answer to decision block 314 is no, then the logic proceeds to a block 316 to find the pre-boot driver advertised by the firmware of the computer system. In one embodiment, the OS searches an EFI configuration table to find the EBC image corresponding to the hardware device. Proceeding to a block 318, the pre-boot driver image is loaded into the pre-boot driver interpreter and executed. In one embodiment, the execution of the pre-boot driver image in the pre-boot driver interpreter is managed by the operating system. In yet another embodiment, the pre-boot driver interpreter is operated in a pre-boot emulator to simulate the pre-boot environment in the OS space.

Next, as depicted in a block 320, the execution of the pre-boot driver image is stopped if the pre-driver attempts to perform an action in violation of one or more policy conditions of the computer system. Using an interpreter allows activity by the pre-boot driver image to be stopped before any action harmful to the computer system may occur. For example, the computer system may have a policy condition that no pre-boot driver is allowed to access the kernel of the operating system. Because the driver image is interpreted, if the pre-boot driver image attempts to access the kernel, the OS can stop the execution of the pre-driver image before the kernel is accessed. In one embodiment, the computer system vendor sets the policy condition; while in another embodiment, the policy condition can be added or modified by a user of the computer system.

In one embodiment, the user is presented with a user interface that enables the user to override the policy to continue execution. In another embodiment, execution of the pre-boot driver is stopped and the hardware device is not allowed to be accessed via the problem pre-boot driver.

After block 320, the logic returns to block 310 to continue execution of the operating system. It will be understood that the OS may repeatedly use the pre-boot driver to repeatedly access the corresponding hardware device. It will also be understood that more than one pre-boot driver corresponding to more than one hardware device may be advertised by the firmware for use by the operating system during OS runtime.

Figure 4:
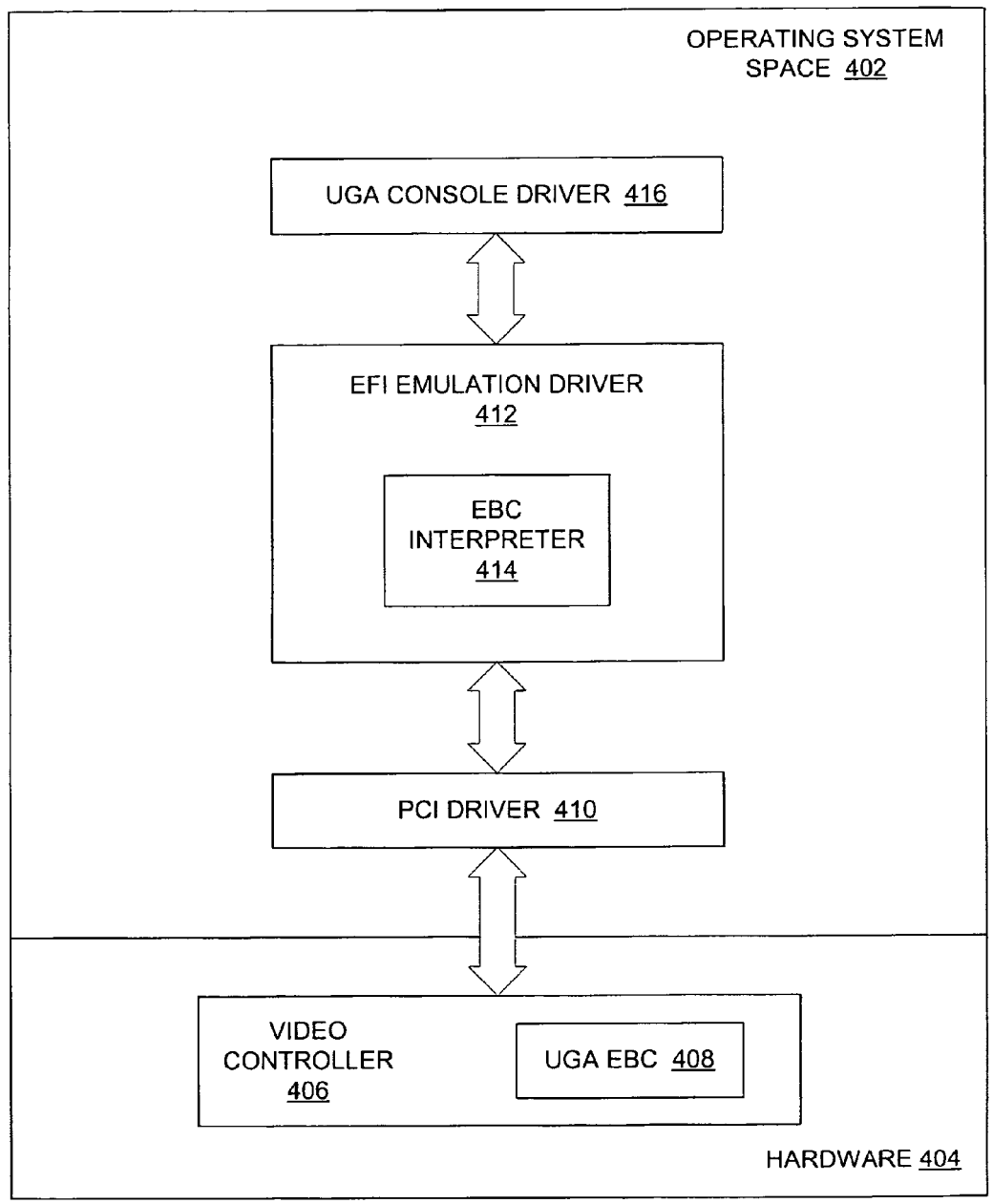
FIG. 4 is a schematic diagram illustrating one embodiment of providing a pre-boot driver for use during operating system runtime of a computer system in accordance with the teachings of the present invention.

FIG. 4 illustrates a computer system 400 according to an embodiment of the present invention. The computer system 400 includes an operating system space 402 layered on top of hardware 404. Hardware 404 includes a video controller 406 on which a Universal Graphics Adapter (UGA) EBC 408 is stored. UGA is a graphics protocol that enables graphics output during the pre-boot phase. Normally, the UGA console driver 416 makes a request that would be serviced by an OS video driver. However, since in the embodiment of FIG. 4 an OS video driver is not available, the UGA EBC 408 may be leveraged to enable interaction with the video controller 406.

The operating system space 402 includes a UGA Console Driver 416, an EFI Emulation Driver 412, and a PCI Driver 410. The UGA EBC 408 was loaded into a memory device of the computer system 400 during the pre-boot phase.

During OS runtime, the OS finds the UGA EBC 408 advertised by the firmware and loads the UGA EBC 408 into an EBC Interpreter 414. The EBC Interpreter 414 is launched within the EFI Emulation Driver 412. The EFI Emulation Driver 412 acts as an interface to handle requests for hardware devices of computer system 400 using pre-boot drivers.

The UGA Console Driver 416 makes a request for video services that is received by the EFI Emulation Driver 412. The EFI Emulation Driver 412 handles the request and passes any parameters to the UGA EBC 408 for execution in the EBC Interpreter 414. The EFI Emulation Driver 412 forwards the request to the PCI Driver 410 which interacts with the video controller 406.

Figure 5:
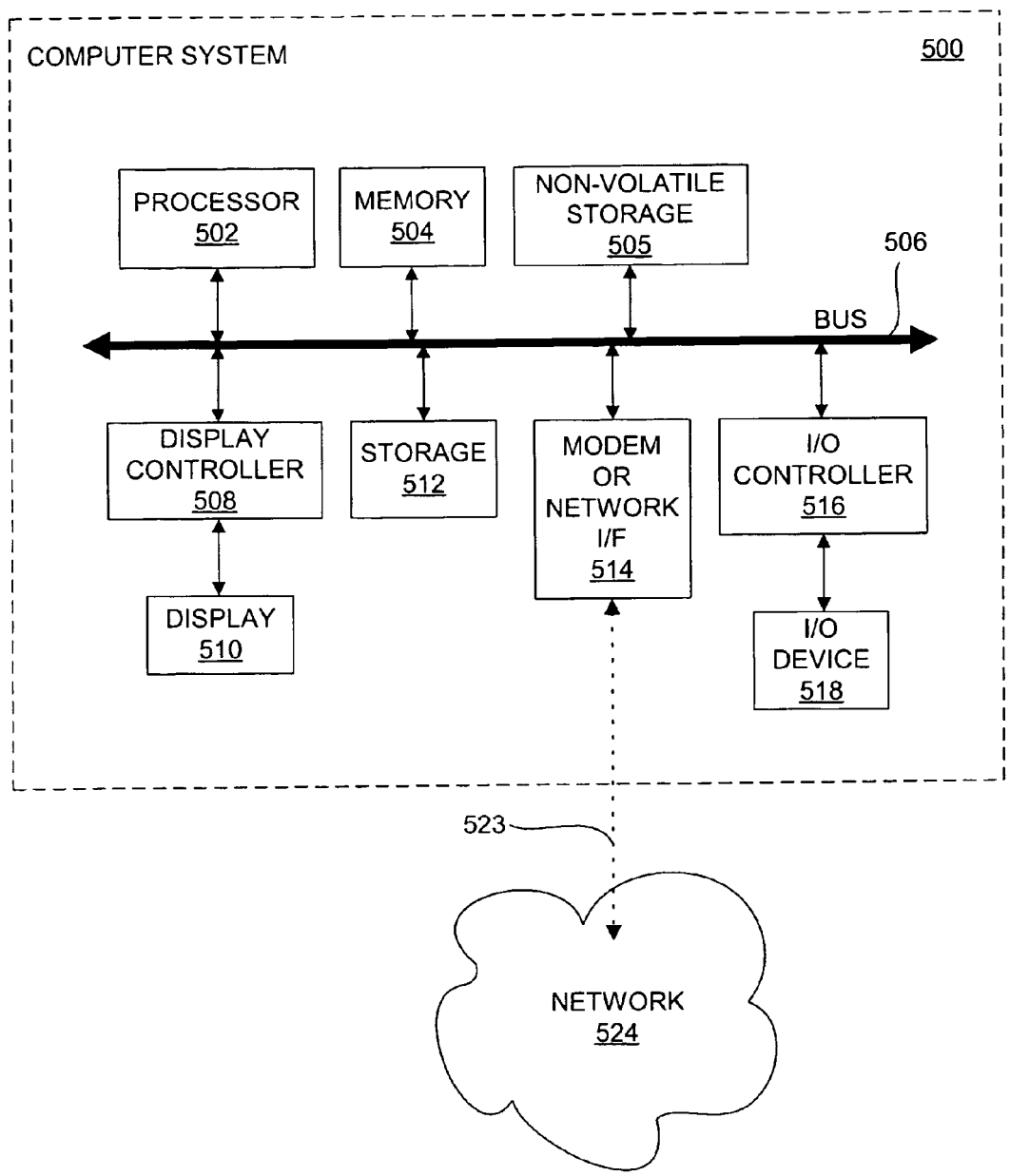
FIG. 5 is a schematic diagram illustrating one embodiment of a computer system in accordance with the teachings of the present invention.

FIG. 5 is an illustration of one embodiment of an example computer system 500 on which embodiments of the present invention may be implemented. Computer system 500 includes a processor 502 coupled to a bus 506. Memory 504, storage 512, non-volatile storage 505, display controller 508, input/output controller 516 and modem or network interface 514 are also coupled to bus 506. The computer system 500 interfaces to external systems through the modem or network interface 514. This interface 514 may be an analog modem, Integrated Services Digital Network (ISDN) modem, cable modem, Digital Subscriber Line (DSL) modem, a T-1 line interface, a T-3 line interface, token ring interface, satellite transmission interface, or other interfaces for coupling a computer system to other computer systems. A carrier wave signal 523 is received/transmitted by modem or network interface 514 to communicate with computer system 500. In the embodiment illustrated in FIG. 5, carrier waive signal 523 is used to interface computer system 500 with a computer network 524, such as a local area network (LAN), wide area network (WAN), or the Internet. In one embodiment, computer network 524 is further coupled to a remote computer (not shown), such that computer system 500 and the remote computer can communicate.

Processor 502 may be a conventional microprocessor including, but not limited to, an Intel Corporation x86, Pentium, or Itanium family microprocessor, a Motorola family microprocessor, or the like. Memory 504 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Display controller 508 controls in a conventional manner a display 510, which in one embodiment may be a cathode ray tube (CRT), a liquid crystal display (LCD), an active matrix display, or the like. An input/output device 518 coupled to input/output controller 516 may be a keyboard, disk drive, printer, scanner and other input and output devices, including a mouse, trackball, trackpad, joystick, or other pointing device.

The computer system 500 also includes non-volatile storage 505 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), or the like.

Storage 512 in one embodiment may be a magnetic hard disk, an optical disk, or another form of storage for large amounts of data. Some data may be written by a direct memory access process into memory 504 during execution of software in computer system 500. It is appreciated that software may reside in storage 512, memory 504, non-volatile storage 505 or may be transmitted or received via modem or network interface 514.

For the purposes of the specification, a machine-readable medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-readable medium includes, but is not limited to, recordable/non-recordable media (e.g., a read only memory (ROM), a random access memory (RAM), a magnetic disk storage media, an optical storage media, a flash memory device, etc.).

It will be appreciated that computer system 500 is one example of many possible computer systems that have different architectures. For example, computer systems that utilize the Microsoft Windows® operating system in combination with Intel microprocessors often have multiple buses, one of which may be considered a peripheral bus. Workstation computers may also be considered as computer systems that may be used with the present invention. Workstation computers may not include a hard disk or other mass storage, and the executable programs are loaded from a corded or wireless network connection into memory 504 for execution by processor 502. In addition, handheld or palmtop computers, which are sometimes referred to as personal digital assistants (PDAs), may also be considered as computer systems that may be used with the present invention. As with workstation computers, handheld computers may not include a hard disk or other mass storage, and the executable programs are loaded from a corded or wireless network connection into memory 504 for execution by processor 502. A typical computer system will usually include at least a processor 502, memory 504, and a bus 506 coupling memory 504 to processor 502.

It will also be appreciated that in one embodiment, computer system 500 is controlled by operating system software. For example, one embodiment of the present invention utilizes Microsoft Windows® as the operating system for computer system 500. In other embodiments, other operating systems that may also be used with computer system 500 include, but are not limited to, the Apple Macintosh operating system, the Linux operating system, the Microsoft Windows CE® operating system, the Unix operating system, the 3Com Palm operating system, or the like.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A computer-implemented method, comprising:
   requesting to access a hardware device of a computer system during operating system (OS) runtime of an operating system executing on the computer system;

accessing the hardware device using an OS native driver for the hardware device if the OS native driver is available to the operating system;
finding a pre-boot driver for the hardware device by the computer system if the OS native driver is not available to the operating system; and
accessing the hardware device during the OS runtime using the pre-boot driver if the OS native driver is not available to the operating system.

2. The method of claim 1, further comprising advertising the pre-boot driver in a data structure by firmware of the computer system, the pre-boot driver to be available to the operating system during OS runtime.

3. The method of claim 2 wherein finding the pre-boot driver comprises searching for the pre-boot driver in the data structure.

4. The method of claim 2 wherein the data structure is compatible with firmware that operates in accordance with an Extensible Firmware Interface (EFI) framework standard.

5. The method of claim 1 wherein accessing the hardware device comprises executing a pre-boot driver image of the pre-boot driver in a pre-boot driver interpreter operating in the operating system environment.

6. The method of claim 5 wherein the pre-boot driver image includes interpreted code to allow management of the pre-boot driver image one op-code at a time.

7. The method of claim 5 wherein the pre-boot driver interpreter is operated in a pre-boot emulator to emulate a pre-boot environment of the computer system.

8. The method of claim 5, further comprising stopping execution of the pre-boot driver image if the pre-boot driver image attempts to violate a policy condition of the operating system.

9. The method of claim 1 wherein the pre-boot driver comprises an EFI Byte Code (EBC) image for the hardware device.

10. The method of claim 1, further comprising loading a pre-boot driver image of the pre-boot driver into a memory device of the computer system during a pre-boot phase of the computer system.

11. An article of manufacture comprising:
a machine-readable medium including a plurality of instructions which when executed by a processor perform operations comprising:
discovering a pre-boot driver of a hardware device during a pre-boot phase of a computer system;
loading a pre-boot driver image corresponding to the pre-boot driver into a memory device of a computer system;
advertising the pre-boot driver in a data structure of the computer system, the data structure available to an operating system of the computer system during OS runtime;
accessing the hardware device using an OS native driver for the hardware device if the OS native driver is available to the operating system; and
accessing the hardware device during the OS runtime using the pre-boot driver if the OS native driver for the hardware device is not available to the operating system.

12. The article of manufacture of claim 11 wherein discovering the pre-boot driver comprises initializing the hardware device during the pre-boot phase having stored the pre-boot driver.

13. The article of manufacture of claim 11 wherein the hardware device comprises a non-volatile storage device to store the pre-boot driver.

14. The article of manufacture of claim 11 wherein the pre-boot driver image comprises an interpreted pre-boot driver image.

15. The article of manufacture of claim 11 wherein the plurality of instructions is to operate in accordance with an Extensible Firmware Interface (EFI) framework standard.

16. The article of manufacture of claim 11 wherein the data structure is compatible with an Extensible Firmware Interface (EFI) framework standard.

17. An article of manufacture comprising:
a machine-readable medium including a plurality of instructions which when executed by a processor perform operations comprising:
receiving a request from an application executing on a computer system to access a hardware device of the computer system;
accessing the hardware device using an OS native driver for the hardware device if the OS native driver is available to the operating system;
finding a pre-boot driver for the hardware device advertised in a data structure of the computer system if the OS native driver is not available to the operating system; and
executing a pre-boot driver image corresponding to the pre-boot driver via a pre-boot driver interpreter during operating system runtime if the OS native driver is not available to the operating system.

18. The article of manufacture of claim 17 wherein receiving the request comprises receiving an Application Program Interface (API) call from the application.

19. The article of manufacture of claim 17 wherein the pre-boot driver image comprises an interpreted pre-boot driver image to enable access to the hardware device.

20. The article of manufacture of claim 17 wherein the data structure is compatible with an Extensible Firmware Interface (EFI) framework standard.

21. The article of manufacture of claim 17 wherein the pre-boot interpreter is to enable managed execution of the pre-boot driver image, wherein the pre-boot driver image includes interpreted code.

22. The article of manufacture of claim 21 wherein the execution of the plurality of instructions further perform operations comprising stopping execution of the pre-boot driver image if the pre-boot driver image attempts to violate a policy condition of the computer system.

23. The article of manufacture of claim 17 wherein execution of the plurality of instructions further perform operations comprising executing a native driver for the hardware device if the native driver for the hardware device is available.

24. A computer system, comprising:
a processor;
an expansion board operatively coupled to the processor; and
at least one flash device operatively coupled to the processor, the at least one flash device including firmware instructions which when executed by the processor perform operations comprising:
initializing the expansion board during a pre-boot phase of the computer system, the expansion board storing a pre-boot driver comprising a pre-boot driver image for the expansion board;
loading the pre-boot driver image into a memory device of the computer system during the pre-boot phase;
advertising the pre-boot driver in a data structure of the computer system to indicate the location of the pre-boot driver image in the memory device;

accessing the hardware device using an OS native driver for the hardware device if the OS native driver is available to the operating system; and accessing the hardware device during the OS runtime using the pre-boot driver if the OS native driver for the hardware device is not available to the operating system.

25. The computer system of claim 24 wherein the firmware instructions are to operate in accordance with an Extensible Firmware Interface (EFI) framework standard.

26. The computer system of claim 24 wherein the pre-boot driver image comprises an EFI Byte Code (EBC) image for the expansion board.

27. The computer system of claim 24 wherein the data structure is compatible with an Extensible Firmware Interface (EFI) framework standard.

* * * * *